United States Patent [19]
Parker

[11] Patent Number: 5,426,729
[45] Date of Patent: Jun. 20, 1995

[54] METHOD AND SYSTEM FOR NONUNIFORMLY ADJUSTING A PREDEFINED SHAPE

[75] Inventor: David C. Parker, Menlo Park, Calif.

[73] Assignee: Microsoft Corporation, Redmond, Wash.

[21] Appl. No.: 904,274

[22] Filed: Jun. 24, 1992

[51] Int. Cl.$^6$ ............................................. G06F 15/20
[52] U.S. Cl. ................................................. 395/155
[58] Field of Search ............... 395/155, 161, 141, 137, 395/138, 139, 118, 121, 11; 340/724, 725, 726

[56] References Cited

U.S. PATENT DOCUMENTS

| | | | |
|---|---|---|---|
| 5,201,034 | 4/1993 | Matsuura et al. | 395/155 |
| 5,212,770 | 5/1993 | Smith et al. | 395/155 |
| 5,237,651 | 8/1993 | Randall | 395/148 |

OTHER PUBLICATIONS

Deneba Software, "Using the Rounded Rectangle Tool," Canvas 3.0 pp. 8-10 and 8-11, 1991.

*Primary Examiner*—Phu K. Nguyen
*Attorney, Agent, or Firm*—Seed & Berry

[57] ABSTRACT

A method and system for adjusting at position of an adjustable portion of a predefined shape. The predefined shape is displayed on a display with an adjust handle positioned near a reference point on the predefined shape. The position of the adjustable portion of the predefined shape is then adjusted in accordance with user input to reposition the adjust handle. The predefined shape is then again displayed having the adjustable portion as adjusted by the user input. The user input is performed by a user positioning device, such as a mouse, by dragging the adjust handle to the desired location. The adjustable portion is predefined with respect to the predefined shape, and is made up of certain segments of the predefined shape that are likely to be altered. In some cases, only segments directly adjacent to a vertex of a predefined shape are adjusted. In some cases, segments symmetrically opposite to those segments are also adjusted.

25 Claims, 9 Drawing Sheets

FIG. 5A
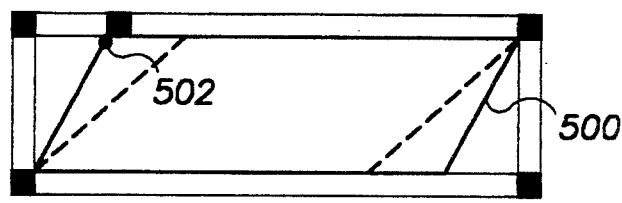
FIG. 5B
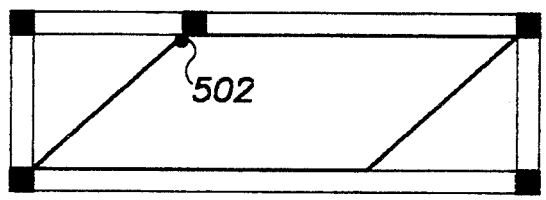
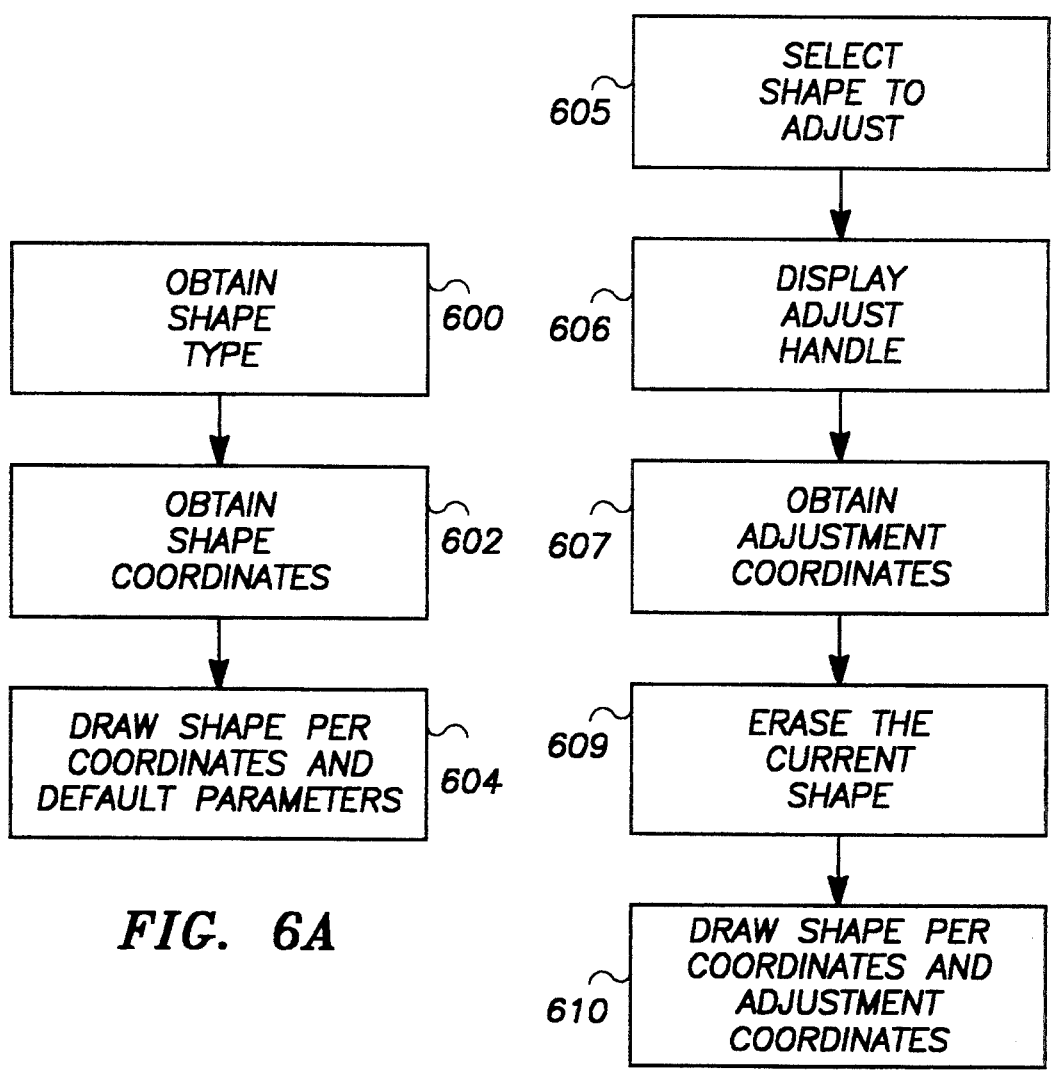
FIG. 6A
FIG. 6B

METHOD AND SYSTEM FOR NONUNIFORMLY ADJUSTING A PREDEFINED SHAPE

TECHNICAL FIELD

The present invention relates generally to the field of computer graphics and, more specifically, to a method and means for adjusting a predefined shape by nonuniformly modifying a portion of the predefined shape in a manner specific to the predefined shape.

BACKGROUND OF THE INVENTION

Currently, computer systems are available that provide users with various computer graphics capabilities. For example, users can create shapes in the form of graphic data objects by using various input devices. These devices can include a mouse, a pen or any functionally equivalent positioning device.

In many of these computer systems, shapes are created and drawn on a display as a result of user selection of a shape type from a number of predefined shape types. Upon selection of the shape type, the user specifies the size and position of a desired shape by selecting defining points such as a centerpoint, vertices, etc., of the shape with the user positioning device. Based on the defining points selected, the computer system draws the desired shape.

In some such computer systems, existing shapes, such as those obtained by the method described above, can be resized by the user. As shown in FIG. 1A, these systems accomplish such a resize operation by providing a boundary of move bars 100 about the shape, which is a parallelogram in this example. The user can then reduce or enlarge the entire shape in the x and y dimension by dragging resize handles 102 provided at an appropriate location, such as the ends of the move bars 100.

In such a resize operation, typically the entire shape is uniformly modified so as to maintain the proportions in the x and y direction. Since all portions of the shape are equally reproportioned in each single direction in which the resize handle is moved, existing angles are not necessarily maintained. For example, in FIG. 1B, operating a mouse to drag the resize handle 102 in the x direction causes all portions of the shape to elongate in that direction, corresponding to the distance the resize handle is dragged. The x component of the parallelogram's offset remains 15% of that of the entire parallelogram, but since the x component of the entire parallelogram is increased, the x component of the offset is increased, and the angle changes to the shear angle 106.

It is often desirable, however, to alter a portion of a shape without altering all portions of the shape as a required result. Unfortunately, a conventional resize operation cannot provide this capability. For example, a user may desire to change the shear angle 104 of the parallelogram shown in FIG. 1A to the shear angle 106 of the parallelogram shown in FIG. 1C, without changing the height or width of the parallelogram. As shown in FIG. 1B, the desired angle can be obtained by elongating the parallelogram in the x direction. The conventional resize operation could also be applied to obtain the desired shear angle by reducing the height of the parallelogram in the y direction, as shown in FIG. 1D. Unfortunately, however, it is not possible to change only the shear angle itself, to obtain the shape in FIG. 1C, without changing the height or width of the parallelogram, as shown in FIGS. 1B and 1D.

In some computer systems, it is of course also possible for a user to alter a shape by independently repositioning each vertex in the shape via the user positioning device. However, such a process is difficult to perform with accuracy, because some degree of human error is likely to occur in positioning the vertices. For example, an attempt to modify the shear angle of the parallelogram shown in FIG. 1C is not likely to produce a true parallelogram having exactly parallel sides. An illustration of such a potentially erroneous result is shown in FIG. 1E.

The above limitations are unfortunate because it is often desirable to nonuniformly adjust a familiar and commonly drawn shape. A nonuniform adjustment can be defined as modifying a portion of the entire shape in a consistent manner specific to the shape, without modifying the entire shape as a result.

In such a case, the user wishes to alter a specific portion of the shape. The user does not, however, wish to reproportion the entire shape as a result of this modification (as in the case discussed above in which the user wishes to change the shear angle of the parallelogram without changing the height or width). It is further desirable that this adjustment be made accurately, without human error. Thus, an accurate, user-driven method and means is desired for nonuniformly adjusting a predefined shape by modifying a portion of the predefined shape in a manner specific to the predefined shape, without modifying the entire shape as a result.

SUMMARY OF THE INVENTION

An object of the present invention is to provide a method and system for nonuniformly adjusting a specific portion of a predefined shape in a manner specific to the shape.

Another object of the present invention is to provide such a method and system without sacrificing accuracy of the shape.

Still another object of the present invention is to reposition text attached to the predefined shape, corresponding to an adjustment of the predefined shape.

These and other objects, which will become apparent as the invention is more fully described below, are obtained by providing a method and system for nonuniformly adjusting a predefined shape by modifying a specific, predesignated adjustable portion of the predefined shape. The predefined shape is displayed on a display with an adjust handle positioned near a reference point on the predefined shape. The shape is then nonuniformly adjusted by modifying the position of the adjustable portion based on user input which repositions the adjust handle. The adjusted, predefined shape is then displayed with the adjustable portion as modified by the user input.

In an embodiment of the present invention, the user input is performed via a mouse by dragging the adjust handle to the desired location. Only an adjustable portion corresponding to or adjacent to a vertex, such as the reference point, and sometimes a vertex and symmetrical portion that is symmetrically opposite to the adjustable portion, are modified in accordance with the user input to reposition the adjust handle.

BRIEF DESCRIPTION OF THE DRAWINGS

FIG. 5A illustrates a parallelogram as originally displayed.

FIG. 5B illustrates a parallelogram as nonuniformly adjusted to have a new shear angle, without changing the overall height or width of the parallelogram, in accordance with the present invention.

FIG. 6 included 6A–6B is a flowchart of the main process of nonuniformly adjusting a predefined shape, as implemented by a computer program in accordance with the present invention.

DETAILED DESCRIPTION OF THE INVENTION

The present invention provides a computer graphics system in which users of the system can "nonuniformly adjust" a predefined shape by modifying a specific adjustable portion of that shape. The shape is "predefined" so as to predesignate a portion of the shape, which users may frequently want to modify, as an adjustable portion. As will be apparent, by predefining the shape in this fashion, it becomes possible for the user to change this adjustable portion quickly, efficiently and accurately.

Figure 1A:
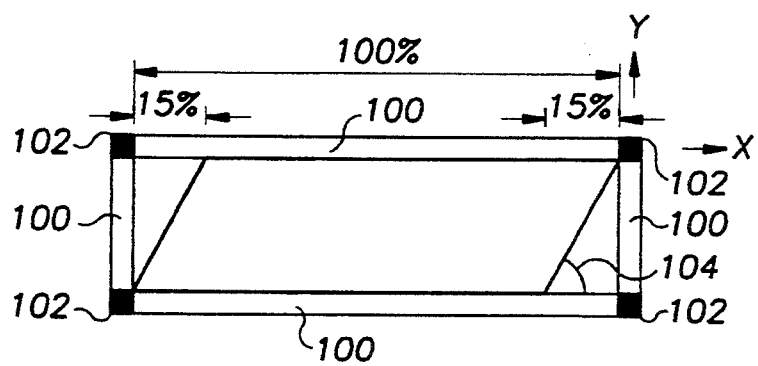
FIG. 1A illustrates a parallelogram as originally displayed.
Figure 1B:
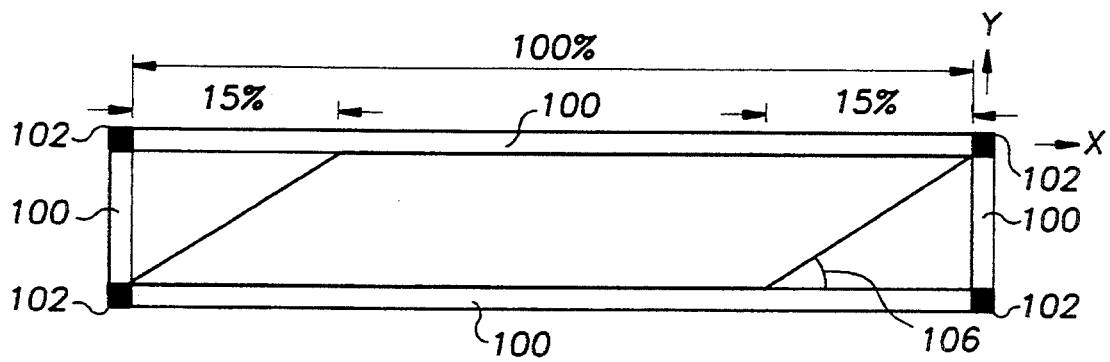
FIG. 1B illustrates the parallelogram as elongated by a conventional resize operation, and as having a modified shear angle obtained by elongating the parallelogram in the x direction.
Figure 1C:
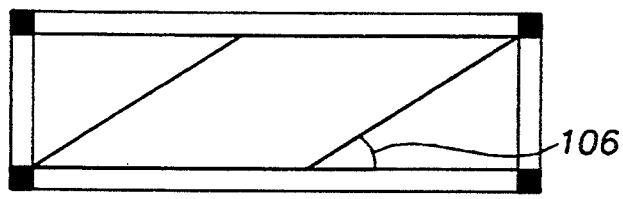
FIG. 1C illustrates the parallelogram as it would appear with a modified shear angle without a change in the height or width of the parallelogram.
Figure 1D:
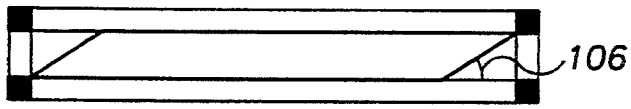
FIG. 1D illustrates the parallelogram resulting from a conventional resize to obtain the modified shear angle by reducing the parallelogram in the y direction.
Figure 1E:
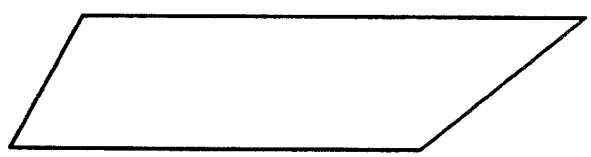
FIG. 1E illustrates an inaccurate representation of the parallelogram resulting from an independent repositioning of each vertex in an attempt to obtain the modified shear angle.
Figure 2A:
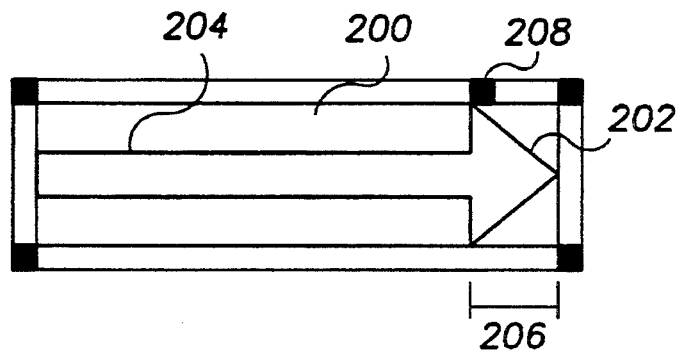
FIG. 2A illustrates an arrow as originally displayed.
Figure 2B:
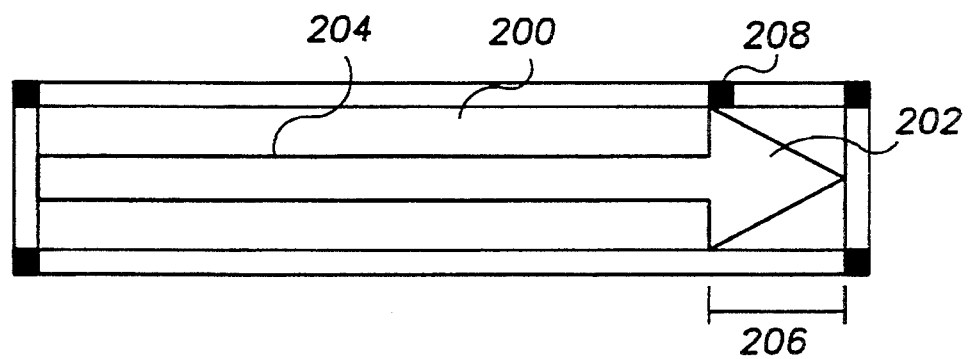
FIG. 2B illustrates the arrow resulting from a conventional uniform resize operation to obtain a desired size of the arrow head.

Many of the predefined shape provided by the computer graphics system are common, frequently used types of shapes which users may desire to draw with varying characteristics. For example, as shown in FIG. 2A, an arrow 200 is a shape type which many users may wish to create as a graphic data object. Previously, the size of the arrow 200 could be modified as designated by a user with a resize option, as explained above. However, with such a conventional resize operation, the length of the head 202 could not be adjusted without uniformly altering the size of the entire arrow 200 in the same direction, including the stem 204, as shown in FIG. 2B.

Figure 2C:
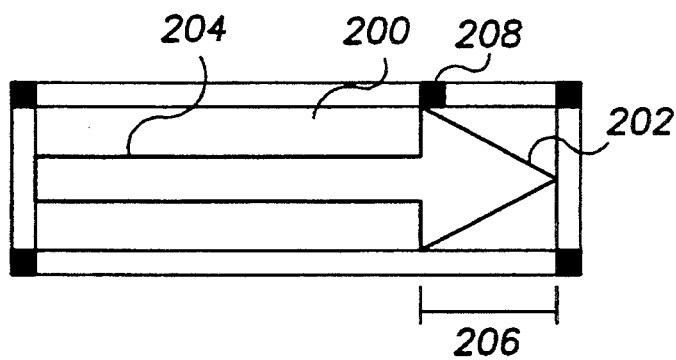
FIG. 2C illustrates the arrow obtained by applying the computer program in the present invention to obtain the desired arrow head size nonuniformly, without changing the overall length of the entire graphic data object.
Figure 3:
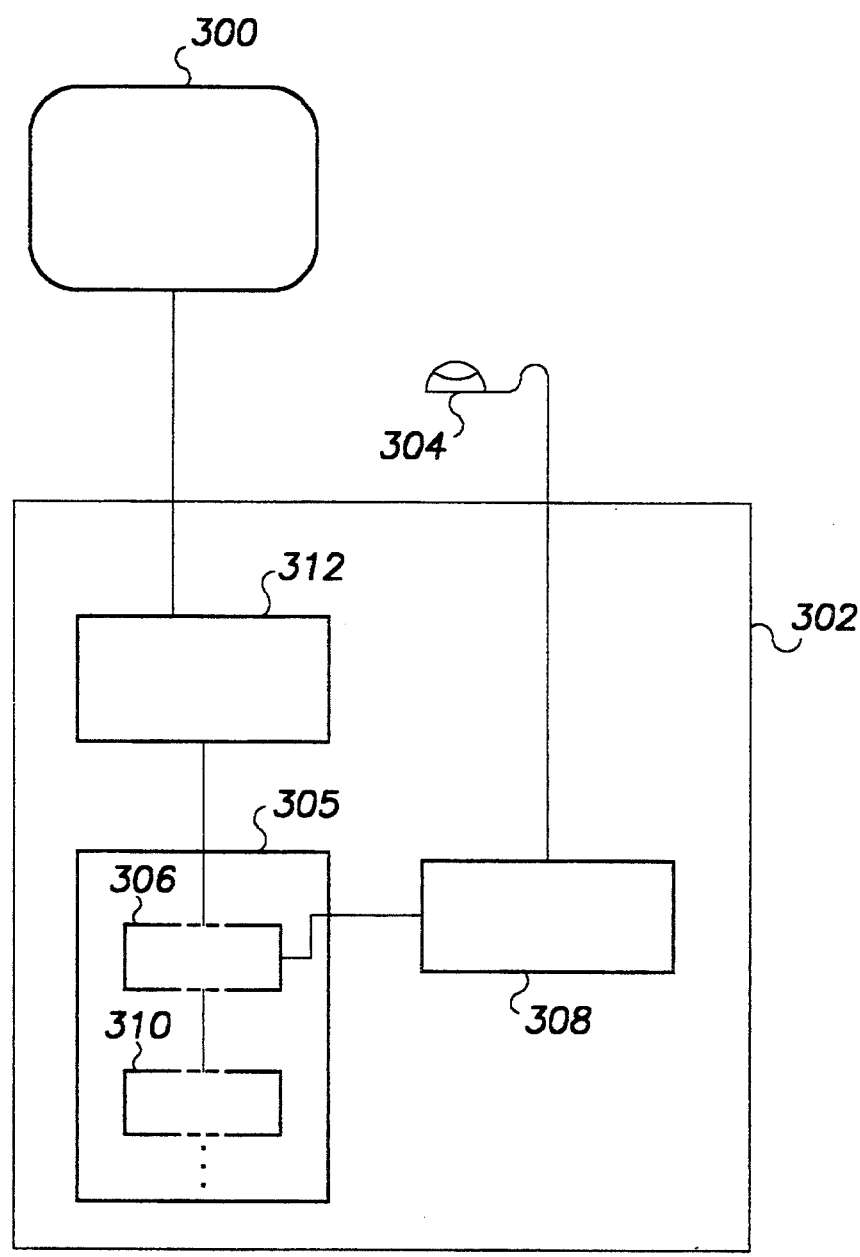
FIG. 3 is a block diagram of the basic apparatus of the computer graphics system in which the present invention is implemented.

In the present invention, however, the head 202 is, alone, an adjustable portion 206 that can be elongated to a new width as shown in FIG. 2C, without changing the height of the head 202, or the height or position of the remaining stem 204. The present invention accomplishes this by providing an adjust handle 208 which the user can move to designate the desired new width of the adjustable portion 206.

In a preferred embodiment of the present invention, a display 300, such as a conventional CRT display monitor, is provided for displaying shapes such as the arrow 200. The display 300 displays these shapes in accordance with graphic data provided by a computer system 302. The graphic data is based on user input via a mouse 304.

The computer system 302 includes a computer 305, such as an IBM PC or compatible. The computer 305 has a conventional CPU, etc., and a memory on which a user interface 306 and a conventional graphics software package resides. The user interface 306 receives user input from the mouse 304 via a mouse driver 308. The user interface 306 executes software from a conventional graphics software package 310, as required, to create and adjust predefined shapes selected by the user. The user interface 306 sends data to a conventional graphics adapter (GA) 312 to effectuate display of the desired shapes on the display 300.

Figure 4:
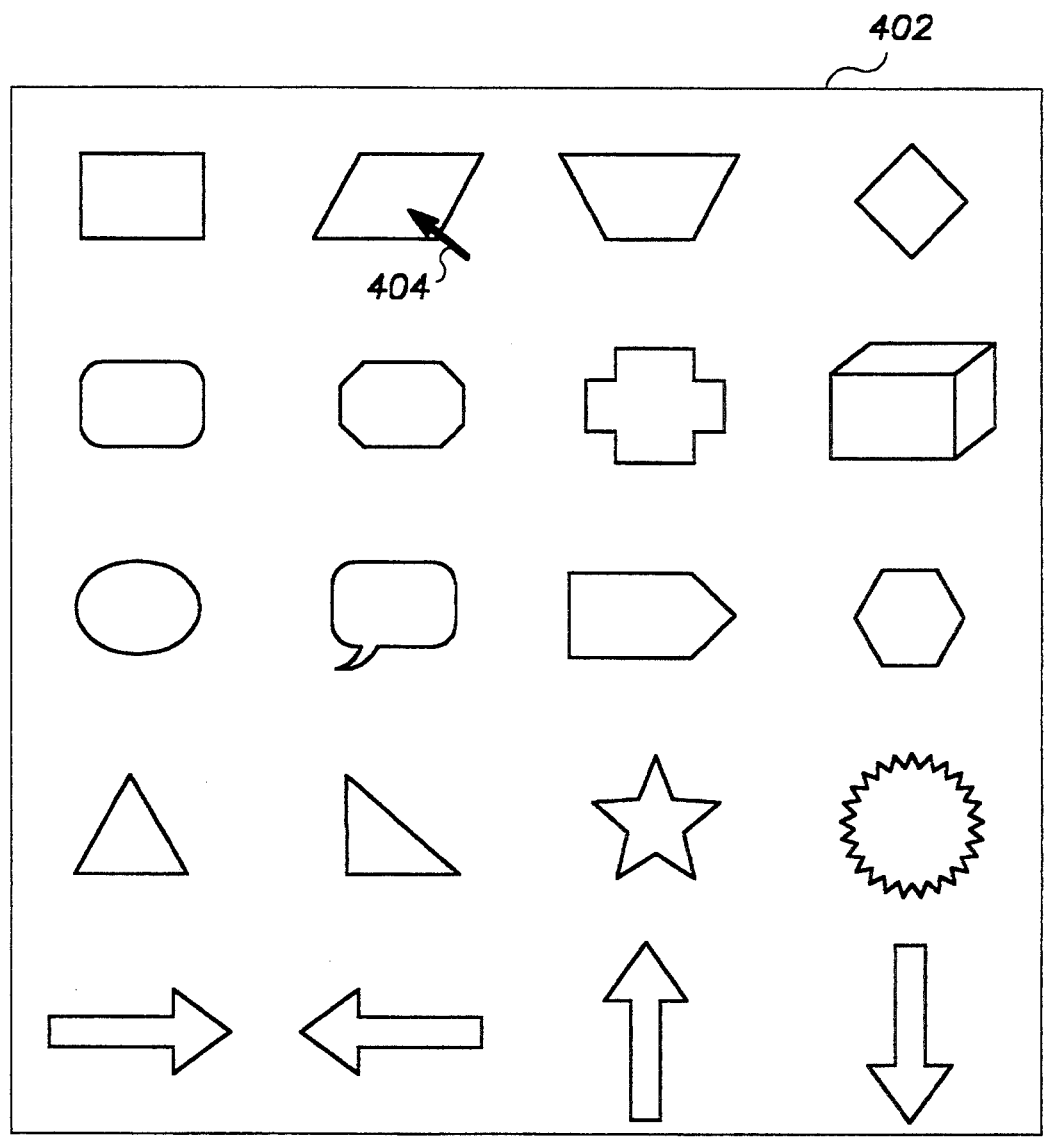
FIG. 4 is an illustration of the menu provided on the display screen for selection of a shape type in accordance with the present invention.

The user interface 306 includes software, which will be described in more detail, to create a number of predefined shapes as graphic data objects. These graphic data objects include rectangles, parallelograms, trapezoids, diamonds, round rectangles, octagons, crosses, cubes, ellipses, voice balloons, 5-sided arrows, hexagons, triangles, right triangles, stars, sunbursts, and right, left, up and down arrows. The user interface 306 provides a menu on the display 300 from which the user can select a predefined shape by clicking the mouse 304 while the cursor 400 is positioned at an appropriate location on the menu 402 to indicate one of these shapes, as shown in FIG. 4. The predefined shape is then created at a desired location as selected by the user by positioning the cursor 400 and dragging the mouse 304 diagonally across the desired bounds of the shape.

Figure 12:
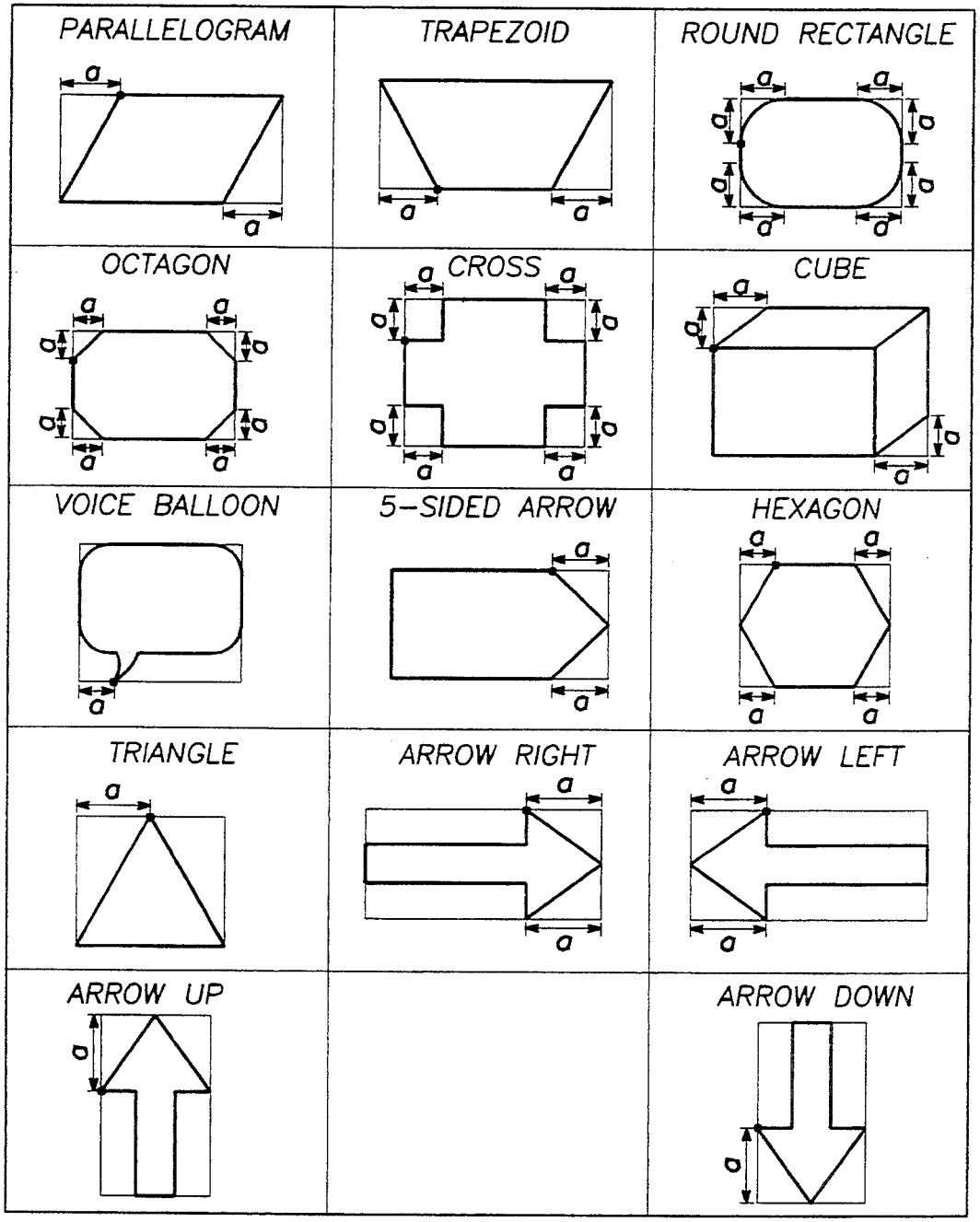
FIG. 12 is an illustration of predefined shapes that can be nonuniformly adjusted.

In the present invention, once, created, many of the predefined shapes can be nonuniformly adjusted in a specific, predefined, way. In the preferred embodiment, these shapes include the parallelogram, trapezoid, round rectangle, octagon, cross, cube, voice balloon, 5-sided arrow, hexagon, triangle, and arrows. For each of these shapes, a portion of the shape is adjustable by dragging an adjust handle to reposition the reference point and thusly redefine the adjustable portion. For example, as shown in FIG. 12, by dragging the adjust handle the reference point is moved to change the value of "a", which defines the amount of adjustment made to the adjustable portion. As a more specific example, a parallelogram 500, as shown in FIGS. 5A and 5B, may be selected by the user via the menu 402. The parallelogram is initially displayed having a shear angle based on a default value for the coordinates of reference point 502 at an original position, as shown in FIG. 5A. However, the coordinates of the reference point 502 can then be redefined by the user, to "adjust" the shape of the parallelogram 500.

The user redefines the coordinates of the reference point 502 by positioning the cursor 400 near the displayed reference point 502 and operating the mouse 304 to drag the cursor to a new position. As the cursor is dragged, a "ghost" version of the shape is drawn to indicate the shape that would appear based on the resulting repositioning of the reference point. This ghost version is represented by the dotted lines in FIG. 5A. The present invention redefines the coordinates of the reference point 502 to the corresponding new position, as shown in FIG. 5B. Based on this new position, the present invention nonuniformly adjusts the shape of the parallelogram in a predefined manner. As will be explained, this adjustment process nonuniformly adjusts different shape types differently, depending on the program predefined in the user interface for the particular shape type. For example, repositioning the reference point 502 of the parallelogram 500 causes a change in the shear angle, as can be seen by comparing FIGS. 5A and 5B.

The processes of creating and adjusting a desired predefined shape are explained with reference to FIGS. 6A and 6B. In a preferred embodiment of the present invention, this process is implemented within the user interface 306 with a computer program in the C programming language. The user interface 306 interfaces between the user and the graphics software package 310 to execute this computer program in the computer 302.

The process of creating a shape is defined in FIG. 6A. In step 600, the computer program obtains the shape type. The shape type is selected by the user by an operation such as clicking the mouse 304 while the cursor is at a desired location on the menu 402. The program reads the coordinates of the cursor position and converts these coordinates to a corresponding shape type. For example, if the mouse 304 is clicked while the cursor 400 is positioned in the parallelogram box in the menu 402, then the cursor coordinates fall within a predesignated range corresponding to the parallelogram shape type, and the parallelogram is assigned as the shape type.

Figure 7:
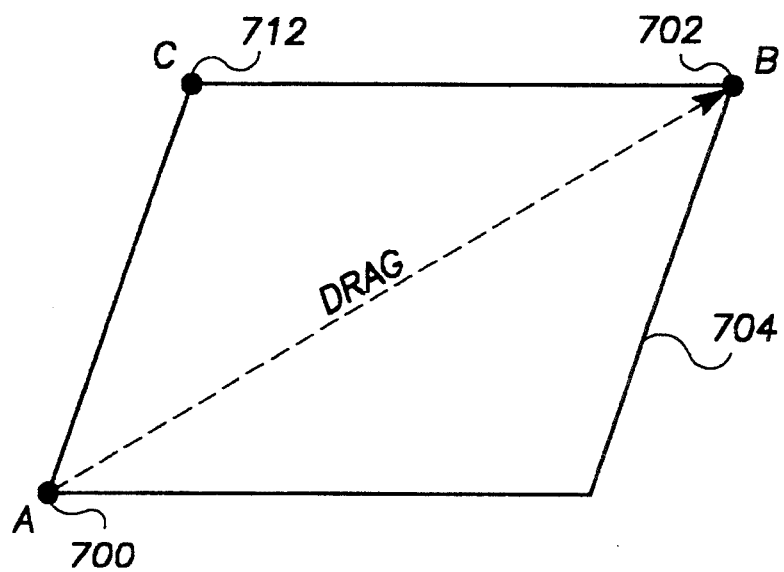
FIG. 7 is an illustration of how shape coordinates of a predefined shape are obtained in step 602 in FIG. 6.
Figure 7:
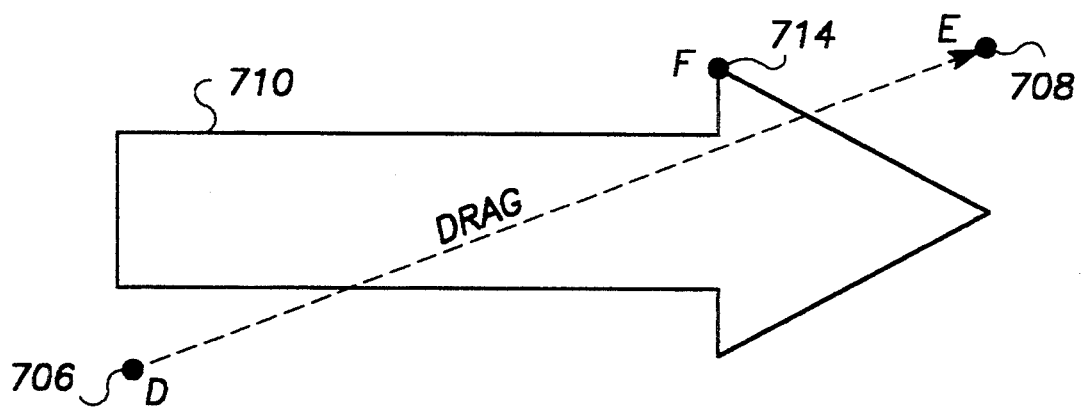

In step 602, the computer program obtains the shape coordinates of the shape which the user desires to draw. The coordinates are input by the user by dragging the mouse 304 after moving the cursor to key locations which correspond to the selected shape type in a predefined way. In FIG. 7, for example, if a parallelogram has been selected, dragging the mouse from point A 700 to point B 702 causes the computer program to draw the parallelogram 704, having a default reference point C 705 which initially defines the shear angle of the parallelogram 704. If an arrow has been selected, dragging the mouse from point D 706 to point E 708 causes the arrow 710 to be drawn.

In step 604, the computer program draws, on the display 300, the desired shape in accordance with the selected shape type, selected shape coordinates, and initial default parameters of an adjustable portion of the shape. For example, the parallelogram 704 is drawn based on the selected parallelogram shape type, the selected shape coordinates A and B, and an initially predesignated default reference point C 705. Similarly, the arrow 710 is drawn based on the selected arrow shape type, the selected shape coordinates D and E, and an initially predesignated default reference point F 714.

The computer program executes step 604 by executing a subprogram designed to draw predefined shapes. For the parallelogram 704, the coordinates (Default_x, Default_y) of the predesignated default reference point C, along with the coordinates of A and B, and the shape type for a parallelogram are sent to the shape drawing subprogram as parameters. For example, the parallelogram 704 would be drawn by executing the DrawShape subprogram illustrated in pseudocode as follows:

*Call DrawShape (parallellogram_type, A_x, A_y,*
*B_x, B_y,*

*Default_x, Default_y)*

This subprogram itself will be explained subsequently in more detail.

The process of adjusting a shape is defined in FIG. 6B. In step 605, the shape to be adjusted is obtained via user selection of an existing shape by clicking on the existing shape with the mouse. In step 606, the computer program displays an adjust handle at the reference point on the drawn shape at a predesignated location. For example, in the parallelogram 500 in FIG. 5A, the adjust handle is initially displayed with the reference point 502 at an original position. The coordinates of the original position correspond to the coordinates of the predesignated default reference point, so that the adjust handle is first displayed at the reference point 502 at the original position in FIG. 5A.

In step 607, the computer program obtains a new reference point position to indicate the nonuniform adjustment of the shape desired by the user. The new position is designated by the user by positioning the cursor on the adjust handle at its original position and operating the mouse to drag the cursor 304 and adjust handle to a new position, as shown in FIG. 5B. As the mouse is dragged, a ghost version of the drawing is drawn, as shown in FIG. 5A, until the desired shape is obtained and the mouse is released. Then, the coordinates of the reference point are changed to new values (New_x, New_y), and the adjust handle is moved with the reference point 502 to the new position shown in FIG. 5B.

In step 609, the original shape is erased. In step 610, the computer program draws a nonuniformly adjusted shape corresponding to the change in coordinates of the reference point. The subprogram to draw the desired shape type is again executed, only now with the new reference point coordinates instead of the default reference point coordinates as before. For example, the parallelogram 500 is adjusted from having the shear angle shown in FIG. 5A, to having the shear angle shown in FIG. 5B, by erasing the original parallelogram and executing the parallelogram drawing subroutine with the new reference point coordinates, as follows:

*Call DrawShape (parallelogram_type, A_x, A_y,*

*B_x, B_y, New_x, New_y)*

The adjustment process described in FIG. 6B can be repeated as often as desired by the user for a selected shape.

Figure 8:
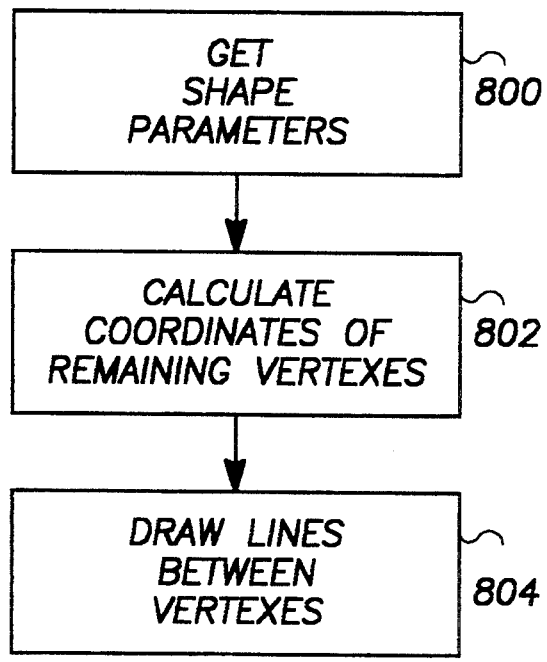
FIG. 8 is a flowchart of a subprogram for implementing the process of drawing a parallelogram, illustrating one type of predefined shape that is drawn in accordance with the present invention.

An example subprogram for drawing a selected shape type, corresponding to the DrawShape subprogram called in steps 604 and 610, is explained with reference to FIG. 8. This subprogram is implemented with a table of parameterized data for each shape type and formulas which manipulate the parameterized data. Included in the data are:
- number of points in shape
- location of each point in a standard coordinate system, for the default adjustment
- which points move when the adjustment changes, and whether they move in x, y direction, or both
- range of valid adjustments
- location of adjust handle
- position of attached text and interpolation points for determining how the text position will change under adjustment.

In step 800, the shape parameters are received from the computer program calling the shape drawing subprogram. The shape parameters include the shape type, shape coordinates and reference point coordinates, as follows:

*Subroutine DrawShape (shape type, x1, y1, x2,*

*y2, x3, y3)*

For example, when DrawShape is called for the parallelogram the parameter "shape type" receives the type value for a parallelogram such as 704, x1, y1 receive the coordinates of selected point A in 704, x2, y2 receive the coordinates of selected point B in 704, and x3, y3 receive the coordinates of the reference point C in 704.

In step 802, the coordinates of the remaining vertices are calculated. In the preferred embodiment, this calculation is based on the internally stored parameterized data. However, one of ordinary skill would recognize many possible ways of calculating the coordinates of points necessary to draw the shape. For example, in the case of a parallelogram and many other adjustable shapes provided by the present invention, the reference point is one of the vertices of the shape. For the parallelogram 704, point C 705 is a vertex. Also, for the parallelogram and many other shapes, the defining selected points are also vertices. Thus, point A 700 and B 702 are also vertices of the parallelogram 704. Since points A and B have already been selected, and point C has also been specified, three of the four vertices of the parallelogram have known coordinates, and only the coordinates of a fourth vertex x4, y4 remain to be calculated.

Figure 9:
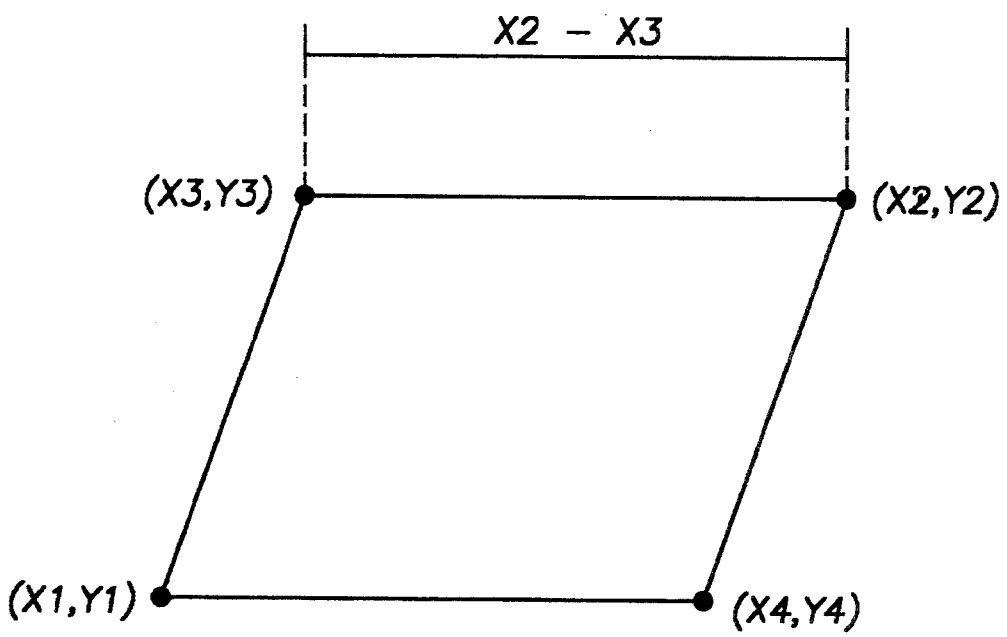
FIG. 9 is an illustration of a virtual parallelogram illustratively representing a parallelogram designated by the coordinates sent as parameters to the parallelogram drawing program in FIG. 8.

Calculation of the fourth vertex x4, y4 is explained with reference to FIG. 9, in which a representative example of a parallelogram is illustrated. Because parallel sides are naturally a property of a parallelogram, opposite sides are of equal length. Thus, the horizontal distance between x2 and x3 is equal to the horizontal distance between x4 and x1. Also, the edges (x3, y3) to (x2, y2) and (x1, y1) to (x4, y4) are always horizontal, such that:

$$x2 - x3 = x4 - x1$$

$$y1 = y4.$$

Applying the above equations, x4, y4 can be derived as follows:

$$x4 = x1 + x2 - x3$$

$$y4 = y1.$$

Returning to FIG. 8, now that the coordinates of all four vertices have been obtained, the shape drawing subprogram draws the parallelogram irk step 804. The subprogram draws the parallelogram by executing a conventional line drawing routine, provided in the graphics software package 310, for drawing straight lines between two points. As an example, a routine such as the illustrative pseudocode routine Linedraw (Px, Py, Qx, Qy) would draw a straight line between points P and Q. Thus, the parallelogram drawing subprogram draws the parallelogram by drawing four lines as follows:

*Call Linedraw (x1, y1, x3, y3)*

Call Linedraw (x3, y3, x2, y2)

*Call Linedraw (x2, y2, x4, y4)*

*Call Linedraw (x4, y4, x1, y1)*

After drawing the adjusted parallelogram based on the new reference point, the shape drawing subprogram returns to the main computer program.

Although the creation and nonuniform adjustment of a parallelogram have been fully described, it should be understood that the present invention provides for creation and nonuniform adjustment of a number of shape types in a similar fashion, including parallelograms, trapezoids, round rectangles, octagons, crosses, cubes, voice balloons, 5-sided arrows, hexagons, triangles, and arrows. All of these shapes can be adjusted quickly, efficiently and accurately by simply changing a reference point to effectuate a predefined corresponding nonuniform adjustment which takes into account parallel, symmetrical, or other features of each shape.

Figure 11:
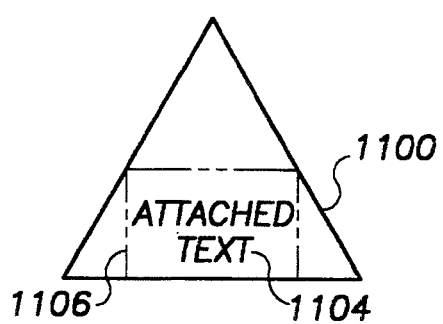
FIG. 11 is an illustration of attached text bounded by a predefined shape adjusted by the present invention, and the attached text realigned to conform to the adjustment of the predefined shape.
Figure 11:
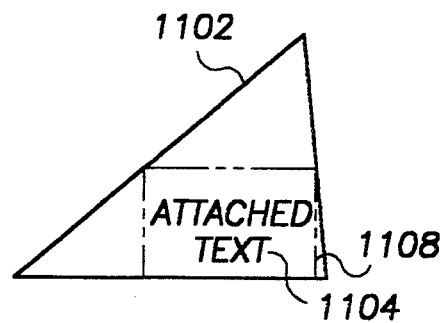

In some cases, a side or sides directly adjacent to a particular vertex might be altered, as in the change of the triangle shown in FIG. 11. Or, both a side or sides adjacent to a vertex, and a side or sides symmetrically opposite to the adjacent side or sides may be altered in a corresponding fashion, as in the change to the arrow from that shown in FIG. 2A to that shown in 2C, or the change to the parallelogram from that shown in FIG. 5A to that shown in 5B.

Figure 10:
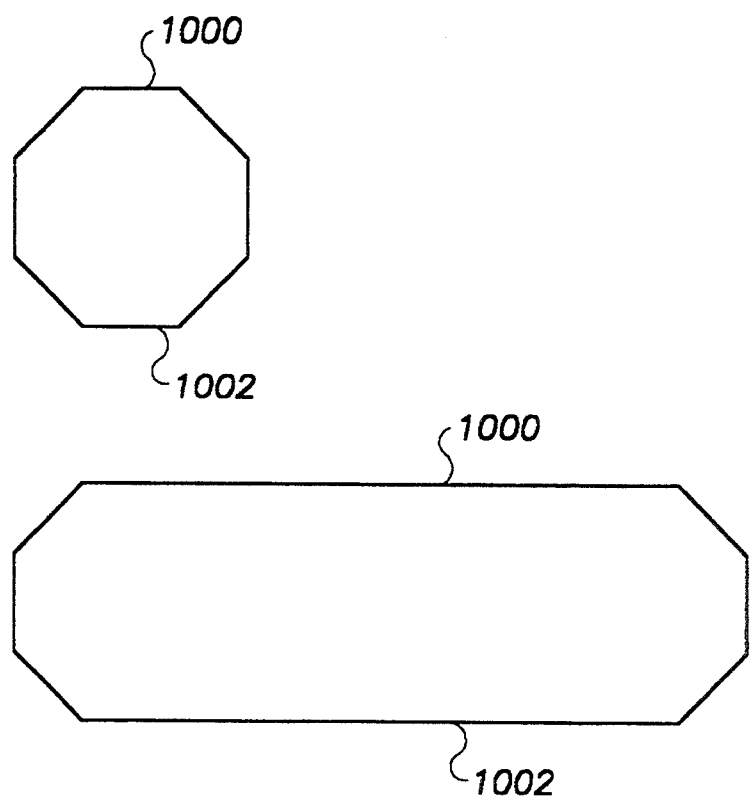
FIG. 10 is an illustration of shape adjustment constraints being maintained after a resizing operation on a shape with adjustment constraints defined in both the x and y directions.

For some predefined shape types, such as the round rectangle, octagon, cross, and cube in FIG. 12, a single adjust value constrains coordinates in both the x and y directions, as shown in FIG. 12. For shapes with this property, applying a conventional resizing operation to the entire shape is defined to retain the equality of the adjust value in both the x and y dimensions rather than performing a uniform resize operation. As a result, some sides are modified while other sides remain as originally provided. An example of this is shown in FIG. 10, where resizing the octagon longer in the x direction results only in changes to the sides 1000 and 1002 in order to retain the adjustment constraints on the diagonal sides in both the x and y directions, as defined in FIG. 12. This is achieved by re-applying the shape adjustment constraints to a shape's new size whenever a resize operation is performed on an adjustable shape.

The computer program in the user interface provides an additional feature of the preferred embodiment of the present invention. In this feature a correspondence is maintained between any attached text bounded by a predefined shape and any adjustment of the predefined shape itself. A feature of some existing computer graphics systems is that text can be "attached" to graphics data objects such that it is displayed within these graphic data Objects. However, since the present invention, as explained above, renders these objects adjustable, it becomes necessary to reposition the attached text when the predefined shape is adjusted.

Attached text can be repositioned in accordance with any change in the predefined shape that bounds the attached text, so that the adjusted predefined shape continues to bound the attached text. Referring to FIG. 11, when the original predefined shape 1100 is adjusted to the adjusted predefined shape 1102, the computer program repositions the attached text 1104 so as to remain bounded by the predefined shape. The present invention accomplishes this repositioning by defining a boundary for the attached text that is itself bounded by the predefined shape. For example, the virtual rectangle 1106, illustratively inscribed within the original predefined shape 1100, represents a boundary that this attached text is drawn in. When the original predefined shape 1100 is adjusted to the adjusted predefined shape 1102, the computer program redefines the virtual rectangle 1106 as the virtual rectangle 1108 illustratively inscribed within the adjusted predefined shape 1102. Accordingly, the computer program repositions the text as necessary so as to be bounded by the virtual rectangle 1106. Two options are provided based on an attribute selected by the user for each object. Either the text will re-wrap horizontally, or will re-center in the rectangle. The latter process may cause the text to exceed the bounding on any side, while the former process may only cause the text to exceed the bounding rectangle on the top and bottom.

Although the present invention has been described in terms of the above-preferred embodiment, the invention itself is not limited to the embodiment described. Implementations and modifications within the spirit of the invention will be apparent to those of ordinary skill in the art. The scope of the invention itself is defined in the following claims.

I claim:

1. A method performed by a computer of adjusting a predefined shape by modifying an adjustable portion of the predefined shape in accordance with user input, comprising the steps of:
    displaying the predefined shape;
    displaying an adjust handle at a reference point on the displayed predefined shape;
    adjusting nonuniformly the predefined shape by modifying the adjustable portion of the predefined shape in accordance with the user input to reposition the adjust handle; and
    displaying the nonuniformly adjusted predefined shape with the adjustable portion as modified.

2. A method according to claim 1 wherein the adjustable portion of the predefined shape is modified by repositioning the adjustable portion of the predefined shape in accordance with a relocation of the reference point resulting from the user repositioning of the adjust handle.

3. A method according to claim 2 wherein corresponding symmetrical portion, symmetrically opposite to the adjustable portion of the predefined shape, is also repositioned to correspond symmetrically to the repositioning of coordinates of the sides which form the adjustable portion of the predefined shape.

4. A method according to claim 2 wherein a side or sides adjacent to a vertex of the predefined shape is repositioned.

5. A method according to claim 2 wherein a side or sides adjacent to a vertex of the predefined shape, and a side or sides symmetrically opposite to the side or sides adjacent to the vertex of the predefined shape, are repositioned.

6. A method according to claim 1 wherein the adjustable portion is adjusted in accordance with mouse input to drag the adjust handle to a location designated by the user.

7. A method according to claim 1, further comprising the step of repositioning text attached to the predefined shape corresponding to the nonuniform adjustment of the adjustable portion of the predefined shape.

8. A method according to claim 1 wherein said nonuniform adjusting of the predefined shape includes displaying a ghost version of the predefined shape indicating the nonuniformly adjusted predefined shape that would result based on a current position of the adjust handle as the adjust handle is repositioned.

9. The method of claim 1 wherein the step of displaying an adjust handle includes the step of displaying an adjust handle at a reference point on the displayed predefined shape, wherein the reference point is on the adjustable portion.

10. The method of claim 1 wherein the step of displaying an adjust handle further includes the steps of:
    designating a reference point on the adjustable portion of the displayed predefined shape; and
    displaying an adjust handle at the reference point on the adjustable portion.

11. A computer graphics system for adjusting a predefined shape by modifying an adjustable portion of the predefined shape displayed on a computer, comprising:
    means for displaying an adjust handle at a reference point on the displayed predefined shape;
    means for nonuniformly adjusting the predefined shape by modifying the adjustable portion of the predefined shape in accordance with user input repositioning the adjust handle; and
    means for displaying the nonuniformly adjusted predefined shape with the adjustable portion as modified.

12. A computer graphics system according to claim 11 wherein said means for nonuniformly adjusting the predefined shape comprises means for repositioning the corresponding adjustable portion of the predefined shape in accordance with a relocation of the reference point resulting from the user repositioning of the adjust handle.

13. A computer graphics system according to claim 12 wherein said means for repositioning the corresponding adjustable portion further comprises means for repositioning coordinates of a vertex and a corresponding symmetrical portion that is symmetrically opposite to the adjustable portion of the predefined shape, to correspond symmetrically to the repositioning of coordinates of the sides which form the adjustable portion of the predefined shape.

14. A computer graphics system according to claim 12 wherein said means for repositioning the corresponding adjustable portion repositions a side or sides adjacent to a vertex of the predefined shape.

15. A computer graphics system according to claim 12 wherein said means for repositioning the corresponding adjustable portion repositions a side or sides adjacent to a vertex of the predefined shape and of a side or sides symmetrically opposite to the side or sides adjacent to the vertex of the predefined shape.

16. A computer graphics system according to claim 11 further comprising a mouse through which the user nonuniformly adjusts the position of the adjustable portion by dragging the adjust handle to a desired location.

17. A computer graphics system according to claim 11, further comprising means for displaying a ghost version indicating the nonuniformly adjusted predefined shape that would result based on a current portion of the adjust handle of the predefined shape as the adjust handle is repositioned.

18. The computer graphics system of claim 11 wherein the reference point is on the adjustable portion.

19. A computer graphics system for adjusting an adjustable portion of a predefined shape having text bounded by the predefined shape, and displayed on a computer, comprising:
means for nonuniformly adjusting the adjustable portion of the predefined shape; and
means for repositioning the text bounded by the predefined shape corresponding to the nonuniform adjustment of the adjustable portion of the predefined shape.

20. A method performed by a computer of adjusting a predefined shape that is one of a parallelogram, a trapezoid, a round rectangle, an octagon, a cross, a cube, a voice balloon, a 5-sided arrow, a hexagon, a triangle, and an arrow, by modifying an adjustable portion of the predefined shape in accordance with user input, comprising the steps of:
displaying the predefined shape;
displaying an adjust handle at a reference point on the displayed predefined shape;
adjusting nonuniformly the predefined shape by modifying the adjustable portion of the predefined shape in accordance with the user input to reposition the adjust handle; and
displaying the nonuniformly adjusted predefined shape with the adjustable portion as modified.

21. A computer graphics system for adjusting a predefined shape that is one of a parallelogram, a trapezoid, a round rectangle, an octagon, a cross, a cube, a voice balloon, a 5-sided arrow, a hexagon, a triangle, and an arrow, by modifying an adjustable portion of the predefined shape displayed on a computer, comprising:
means for displaying an adjust handle at a reference point on the displayed predefined shape;
means for nonuniformly adjusting the predefined shape by modifying the adjustable portion of the predefined shape in accordance with user input repositioning the adjust handle; and
means for displaying the nonuniformly adjusted predefined shape with the adjustable portion as modified.

22. A method performed by a computer of adjusting an adjustable portion of a predefined shape, the adjustable portion having an associated adjustment constraint which defines an extent to which the adjustable position can be adjusted, comprising the steps of:
displaying the predefined shape;
resizing the predefined shape;
adjusting nonuniformly the adjustable portion of the predefined shape to conform to the adjustment constraint; and
displaying the nonuniformly adjusted predefined shape.

23. A computer graphics system for adjusting a predefined shape during resize of the predefined shape, an adjustable portion of the predefined shape having an associated adjustment constraint which defines an extent to which the adjustable position can be adjusted, comprising:
means for displaying the predefined shape;
means for resizing the predefined shape;
means for adjusting nonuniformly the adjustable portion of the predefined shape to conform to the adjustment constraint; and
means for displaying the nonuniformly adjusted predefined shape.

24. A method performed by a computer of adjusting a predefined shape that is an arrow by modifying an adjustable portion of the arrow in accordance with user input, comprising the steps of:
displaying the arrow with an adjust handle;
adjusting nonuniformly the arrow by modifying the adjustable portion of the arrow in accordance with the user input to reposition the adjust handle; and
displaying the nonuniformly adjusted arrow with the adjustable portion as modified.

25. The method of claim 24 wherein the arrow has a head, wherein the step of adjusting nonuniformly the arrow includes the step of adjusting nonuniformly the head of the arrow in accordance with the user input to reposition the adjust handle.

* * * * *